US008947535B2

(12) United States Patent
Arima

(10) Patent No.: US 8,947,535 B2
(45) Date of Patent: *Feb. 3, 2015

(54) TRANSACTION MANAGEMENT FOR RACING ENTERTAINMENT

(71) Applicant: Takayuki Arima, Rancho Palos Verdes, CA (US)

(72) Inventor: Takayuki Arima, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/706,075

(22) Filed: Dec. 5, 2012

(65) Prior Publication Data
US 2013/0182116 A1 Jul. 18, 2013

Related U.S. Application Data

(63) Continuation-in-part of application No. 13/353,221, filed on Jan. 18, 2012, now Pat. No. 8,650,585.

(60) Provisional application No. 61/668,264, filed on Jul. 5, 2012.

(51) Int. Cl.
H04N 7/18 (2006.01)
G03B 17/48 (2006.01)
G03B 19/00 (2006.01)
(Continued)

(52) U.S. Cl.
CPC .......... *H04N 7/181* (2013.01); *G06Q 30/0201* (2013.01); *H04N 21/21805* (2013.01); *H04N 21/2187* (2013.01); *H04N 21/25891* (2013.01); *H04N 21/47211* (2013.01);
(Continued)

(58) Field of Classification Search
CPC . H04N 7/181; H04N 21/478; H04N 21/8126; H04N 21/47211; H04N 21/21805; H04N 21/2187; H04N 21/25891; H04N 21/8545; G06Q 30/0201
USPC ........................................................ 348/157
See application file for complete search history.

(56) References Cited

U.S. PATENT DOCUMENTS 5,830,068 A 11/1998 Brenner et al.
7,106,360 B1 * 9/2006 Frederick ...................... 348/157
(Continued)

FOREIGN PATENT DOCUMENTS

EP 1452213 A1 9/2004

OTHER PUBLICATIONS

International Search Report and Written Opinion of International Searching Authority on PCT/US2012/068091.
(Continued)

Primary Examiner — Hee-Yong Kim
(74) Attorney, Agent, or Firm — LambentIP

(57) ABSTRACT

A system and method are provided to perform operations for racing entertainment, including providing each of multiple racers with a device to capture images and sounds as perceived by the racer during a race, obtaining information pertaining to each of multiple users such as account information and selection of a racer whom the user wants to got connection with, managing transactions, processing the images and sounds, and transmitting the processed images and sounds from the racer to a client terminal of the user who selected the racer. The present system and method may be configured to allow users to play a racing game based on the captured images and sounds by actual racers.

24 Claims, 14 Drawing Sheets

(51) Int. Cl.

| | | |
|---|---|---|
| *G03B 29/00* | (2006.01) | |
| *A63F 9/24* | (2006.01) | |
| *A63F 13/00* | (2014.01) | |
| *G06F 17/00* | (2006.01) | |
| *G06F 19/00* | (2011.01) | |
| *G06Q 30/02* | (2012.01) | |
| *H04N 21/218* | (2011.01) | |
| *H04N 21/2187* | (2011.01) | |
| *H04N 21/258* | (2011.01) | |
| *H04N 21/472* | (2011.01) | |
| *H04N 21/478* | (2011.01) | |
| *H04N 21/81* | (2011.01) | |
| *H04N 21/8545* | (2011.01) | |

(52) U.S. Cl.
CPC ........ *H04N 21/478* (2013.01); *H04N 21/8126* (2013.01); *H04N 21/8545* (2013.01)
USPC ............. 348/157; 348/159; 396/429; 463/16; 463/25; 463/42

(56) References Cited

U.S. PATENT DOCUMENTS

| | | | |
|---|---|---|---|
| 7,379,886 | B1 | 5/2008 | Zaring et al. |
| 7,914,370 | B2* | 3/2011 | Weller ............................ 463/16 |
| 2003/0142829 | A1 | 7/2003 | Avigni |
| 2003/0153374 | A1 | 8/2003 | Gilmore |
| 2007/0021055 | A1* | 1/2007 | Arseneau et al. ............ 455/3.06 |
| 2008/0207310 | A1* | 8/2008 | Mindes ........................... 463/25 |
| 2009/0053974 | A1 | 2/2009 | Domm et al. |
| 2009/0093290 | A1* | 4/2009 | Lutnick et al. .................. 463/16 |
| 2009/0239598 | A1 | 9/2009 | Abe |
| 2009/0262194 | A1* | 10/2009 | Wakefield et al. ............ 348/157 |
| 2009/0312854 | A1* | 12/2009 | Jung et al. ....................... 700/90 |
| 2010/0171834 | A1* | 7/2010 | Blumenfeld ................... 348/159 |
| 2013/0185743 | A1* | 7/2013 | Arima ............................... 725/1 |

OTHER PUBLICATIONS http://www.liquidimageco.com/.
Screen Print of the Above Item 1.
http://www.engadget.com/2012/03/16/sky-sports-for-ipad-2-0-launches-with-live-tv-streaming-f1-race/.
Screen Print of the Above Item 3.

* cited by examiner

TRANSACTION MANAGEMENT FOR RACING ENTERTAINMENT

CROSS REFERENCE

This application is a continuation-in-part of U.S. patent application Ser. No. 13/353,221, filed on Jan. 18, 2012. This application claims the benefit of U.S. provisional application Ser. No. 61/668,264, filed on Jul. 5, 2012.

BACKGROUND

With the advancement of TV games, video games and other digital and mobile entertainment technologies, people are more and more opted for staying indoors. The number of spectators who go out to a stadium for sports games or races is declining, thereby shaking the economy of related industries. In particular, the racing industry has been hit hard since racing excitements can be easily and virtually experienced by playing racing games on a cellular phone, a smart phone, iPad®, a tablet and other mobile devices or a TV system, which are readily available to a user. However, these pre-programmed games tend to have preset scenarios limiting the variations that the user can enjoy, thereby eventually boring the user.

Accordingly, the present invention is directed to a new type of entertainment business that enables users to enjoy the vivid images and sounds as perceived during a race by a racer of his/her choice. Such entertainment can provide the user with the realistic experience filled with real-time, on-site and unforeseen excitements, thereby expected to open up a new entertainment paradigm. "Races" in this document refer to competitions on speed involving motorcycles, cars bicycles, boats, aircrafts, horses, skis, skates, skateboards, sleighs, wheelchairs, yachts, and other vehicles or animals.

DETAILED DESCRIPTION

Figure 1:
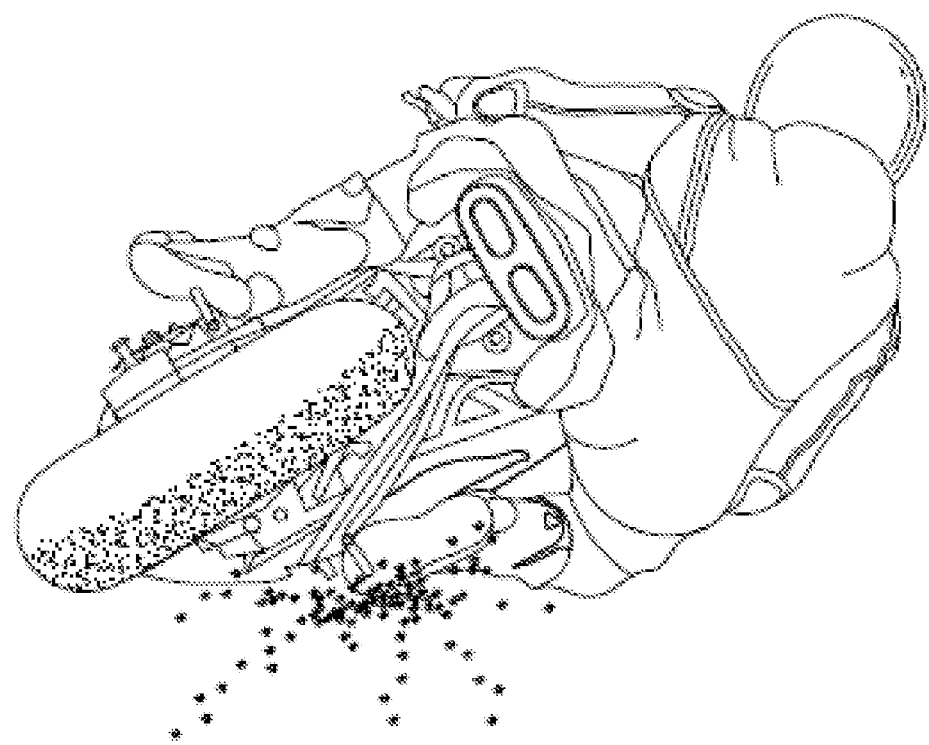
FIG. 1 illustrates an example of a view perceived by a racer following another racer running ahead of him during a motorcycle racing.

FIG. 1 illustrates an example of a view perceived by a racer following another racer running ahead of him during a motorcycle racing. The excitement among the race participants is apparent owing to the dynamics of the real-time views and sounds, such as the way the preceding racer maneuvers his motorcycle, surrounding scenes passing by with a high speed, sparks created, roaring sound, etc. Such excitements of a real-time racing cannot be felt by mere spectators. In a conventional broadcasting system, one or more cameras are provided at fixed locations outside the race track, providing views and sounds as perceived by a spectator. Enabling users to receive the vivid images and sounds as perceived by a racer can provide the exciting racing experience, hence a new type of entertainment. Such entertainment may be realized by using a system that is configured to capture images and sounds as perceived by a racer, and transmit them to a user so that the user can virtually experience the race as if he/she is participating in the race.

Figure 2:
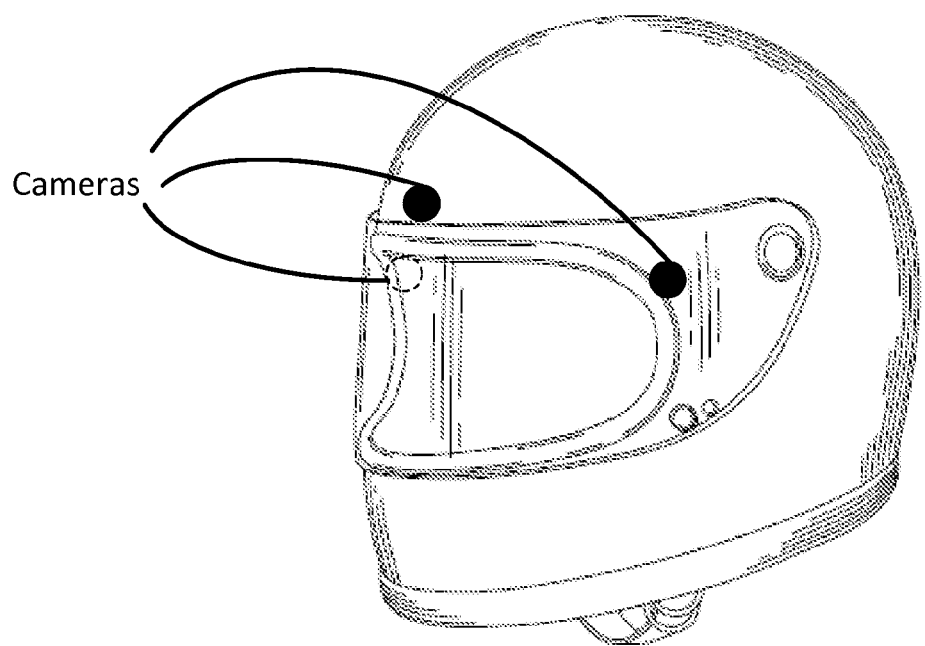
FIG. 2 illustrates an example of the positions of cameras attached to a helmet.

The images perceived by a racer can be captured by one or more cameras provided in the proximity of his/her eyes. FIG. 2 illustrates an example of the positions of the cameras. In this example, three cameras are attached to the racer's helmet: one near the forehead and two near the both sides of the eyes. Two or more cameras can capture the images as seen from two or more perspectives, respectively, which can be processed by using a suitable image processing technique for the viewer to experience the 3D effect. Similarly, one or more microphones may be attached to the helmet to capture the sounds. For example, two separate microphones may be placed near both the ears of the racer, to capture the sounds from two audible perspectives, respectively, which can be processed by using a suitable sound processing technique for the viewer to experience the stereophonic effect. In another example, a microphone may be placed at the back side of the helmet so that the sound from behind can be clearly captured to sense what's going on behind him/her in the race. This gives an interesting experience for the user connected to the racer running first, since the user can sense if another racer is catching up or the first racer is taking a big lead by listening to the sounds from behind. In yet another example, a device including both a camera and a microphone may be used. For example, two such devices may be placed on the racer's temples to capture both the images and sounds at locations as close as possible to the eyes and ears at the same time.

Figure 3:
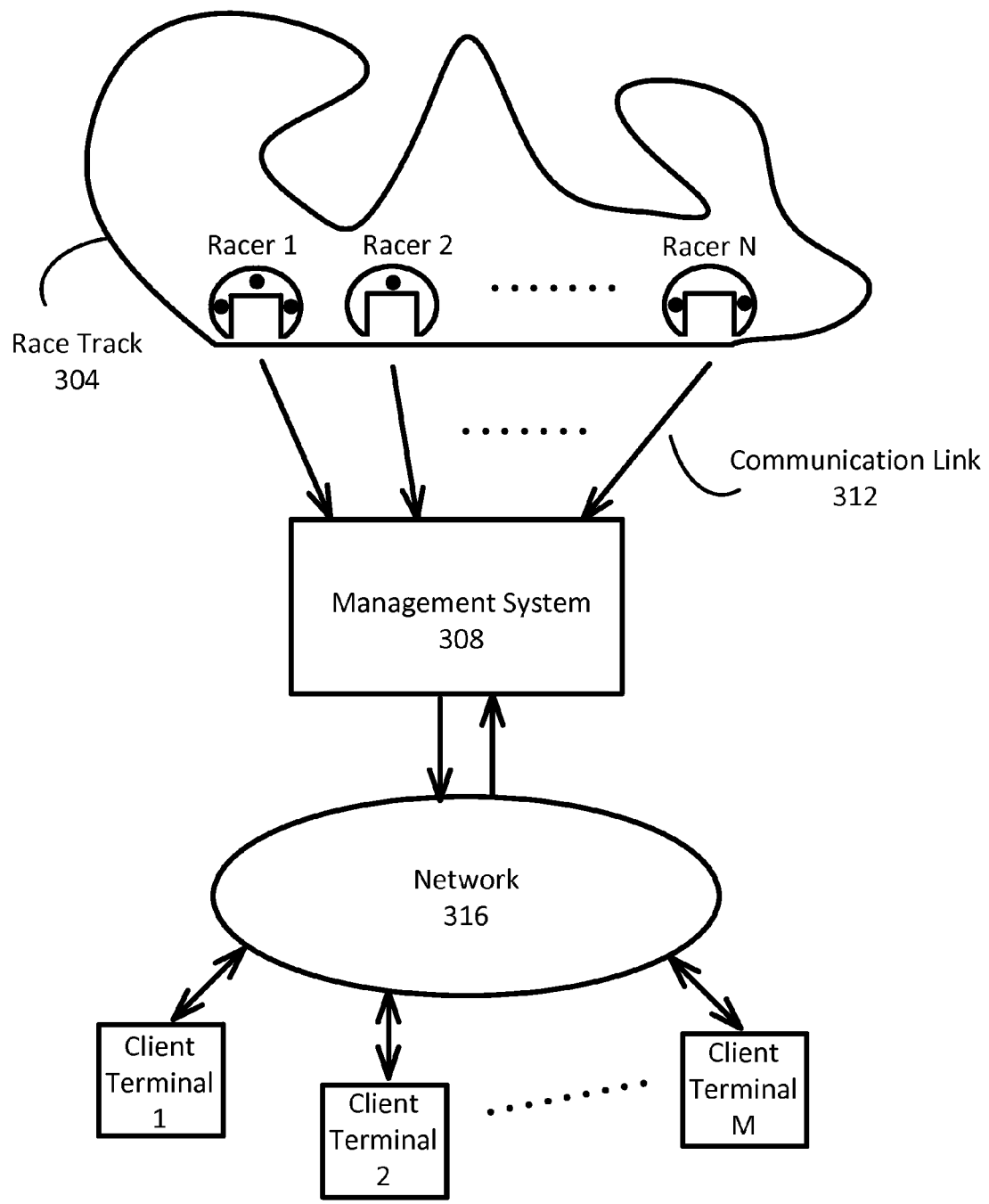
FIG. 3 illustrates an example of a system according to an embodiment for providing entertainment services by capturing images and sounds as perceived by a racer, and transmitting them to a user so that the user can virtually experience the race as if he/she is participating in the race.

FIG. 3 illustrates an example of a system according to an embodiment for providing entertainment services by capturing images and sounds as perceived by a racer, and transmitting them to a user so that the user can virtually experience the race as if he/she is participating in the race. Examples in this document are described in the context of the motor cycle racing. However, those skilled in the art recognize that applications can be made to any racing, involving cars, bicycles, boats, aircrafts, horses, skis, skates, skateboards, sleighs, wheelchairs, yachts, and other vehicles or animals.

Referring to FIG. 3, a race track 304 is provided where multiple racers, racer 1, racer 2 . . . and racer N compete in the race. Each racer is equipped with one or more cameras and one or more microphones attached to his/her helmet, for example. In the example of FIG. 3, the racer 1 wears a helmet with three cameras, the racer 2 wears a helmet with one camera, and the racer N wears a helmet with two cameras, as represented by solid circles. The cameras and/or microphones may be attached to a racer's face directly or to a protecting gear other than a helmet. The number of cameras and the number of microphones carried by a racer may be any number according to predetermined needs for image and sound reception. As mentioned earlier, a device including both a camera and a microphone, or other sensing devices may be used. The images and sounds captured by the cameras, microphones or other devices are transmitted to a management system 308 through a communication link 312. The communication link 312 may represent a signal channel based on wireless communication protocols, satellite transmission protocols, or any other signal communication schemes.

The management system 308 may be located in a server or a computer, and is configured to receive and process the signals including the images and sounds transmitted from the racers. The management system 308 is further configured to communicate with client terminals, 1, 2 . . . and M through a network 316. The network may include the Internet, TV broadcasting network, satellite communication network, local area network (LAN), wide area network (WAN), personal area network (PAN), and other types of network. The client terminals may include cellular phones, smart phones, iPad®, tablets and other mobile devices or TV systems. Each client terminal is configured to have a screen and a speaker to reproduce the images and sounds that have been transmitted from a racer and processed by the management system 308.

Figure 4:
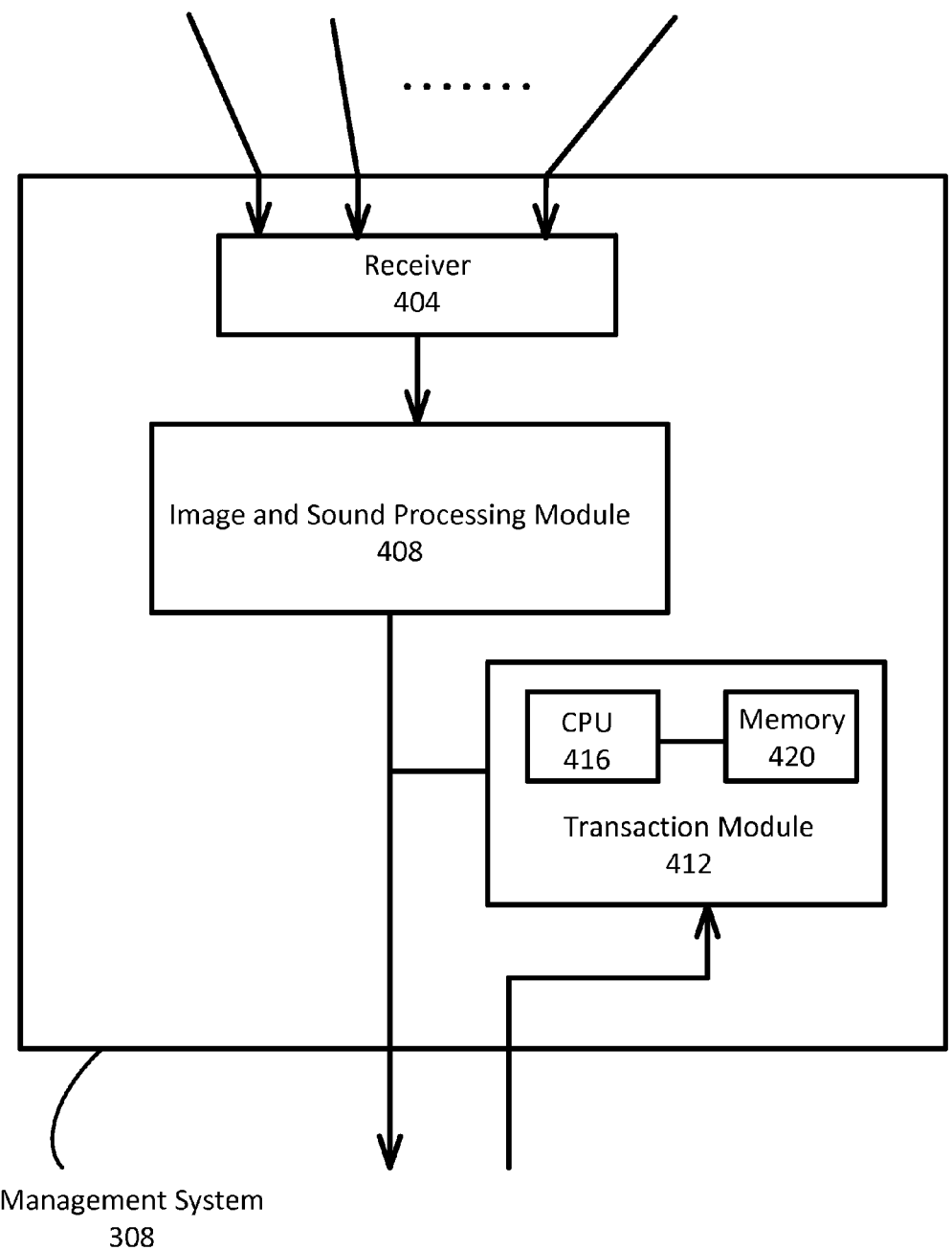
FIG. 4 is a block diagram illustrating the management system.

FIG. 4 is a block diagram illustrating the management system 308. The signals transmitted from the racers are received by a receiver 404. The receiver 404 may include an antenna or a satellite dish, with additional components for analog-to-digital conversion, digital-to-analog conversion, power amplification, digital signal processing, etc. to receive the signals with high efficiency and fidelity. Any receiver technologies known to those skilled in the art can be utilized for the implementation of the receiver 404. The received signals are sent to an image and sound processing module 408, where the images and sounds are processed and prepared for transmission to the client terminals. For example, the images with different perspectives captured by two or more cameras of the racer may be processed for the user to experience the 3D effect. In another example, blurred or rapidly fluctuating images due to camera shaking may be corrected to be viewed without causing discomfort to the user. In yet another example, a loud noise, such as the roaring sound of the vehicle, may be reduced to a comfort level. In yet another example, the sounds from different audible perspectives captured by two or more microphones of the racer may be processed for the user to experience the stereophonic effect. Any image and sound processing technologies known to those skilled in the art can be utilized for the implementation of the image and sound processing module 408. The management system 308 further includes a transaction module 412 which may include a CPU 416 for controlling algorithms, electronic components and modules, information flow, etc. as well as a memory 420 for storing predetermined data and/or acquired data during the operation. The data can be updated as needed.

The transaction module 412 is configured to receive input information that the users input on the respective client terminals and thereafter transmitted through the network 316. A prompt page may be configured for the users to input necessary information. The input information pertains to the user, including an ID of the user, his/her choice of the payment method (credit card, PayPal®, money order, etc.), his/her credit card number if the credit card payment is chosen, and other account information. In addition to such account information, the user is asked which racer he/she wants to be connected to, so that the user can virtually share the common experience with his/her favorite racer through the images and sounds captured by the cameras and microphones placed in the proximity of the racer's eyes and ears. The received information may be stored in the memory 420 and updated when the user changes his/her account information, favorite racer to be connected to, or any other information pertaining to the user.

Upcoming events and schedules may be sent in advance by the transaction module 412 to the client terminals. The users may request to receive such event information via emails. Such event information can be broadcast via audio/visual media. Alternatively, a website may be created for general audience to access, and the upcoming events and schedules may be posted on the site. The schedule may list the names or IDs of the racers participating in each upcoming race so that each user can select the race to watch and the racer to get connected to. The connection fee may be a flat rate, for example, a few dollars, which can be set at lower than the fee to actually get a seat in the racing stadium. Prior to the race, the input information including the account information and the choice of a racer is obtained by the transaction module 412 from each user as inputted on the client terminal. Payment can be made using the payment method that the user specified as part of the account information. The transaction module 412 is configured to send the processed images and sounds, corresponding to the racer of choice, to the client terminal of the user who chose the particular racer.

Figure 5:
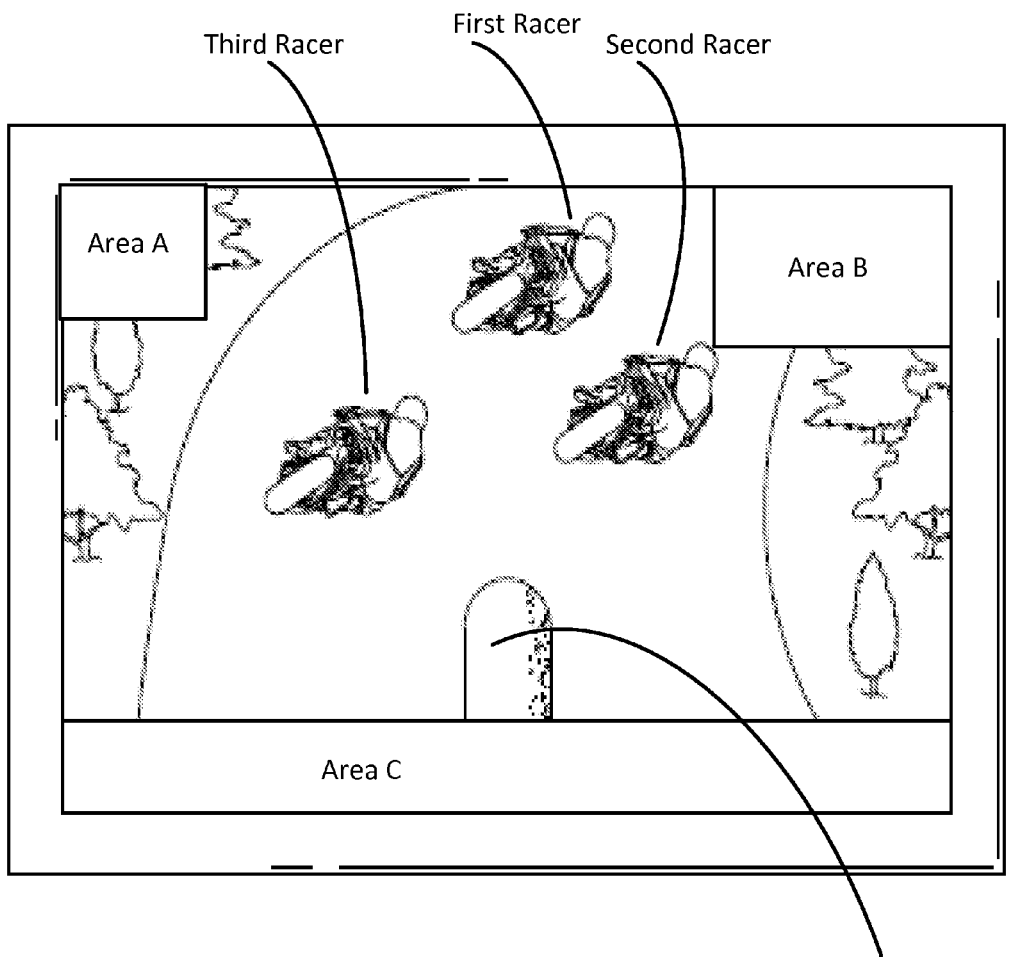
FIG. 5 illustrates an example of an image displayed on the client terminal.

FIG. 5 illustrates an example of an image displayed on the client terminal. The racer whom the user selected to get connection with is running No. 4, following three racers ahead of him/her who are turning along a sharp curve. The exciting moments are seized and experienced by the user. In addition to the racing scenes, advertisement can be shown in the lower area, at a corner or at the side of the screen as indicated by Area A, Area. B or Area C. In exchange of advertisement fees from marketers or sponsors, these images or films advertising goods or services can be pre-stored in the memory 420 of the transaction module 412, and released for viewing at the same time when the images and sounds of the racing are outputted from the image and sound processing module 408. These areas may be used for other purposes. For example, one area may be used for showing TV broadcast scenes. This can be realized by contracting the TV broadcasting company in advance and obtaining the transmitted scenes through the communication link 312 of FIG. 3, for example, to the management system 308. In this way, the user can enjoy not only the scenes as captured by the racer of his/her choice but also the overall picture transmitted by the TV broadcast. In another example, one area may be used for showing the time, speed, laps, rank and other racing information associated with the racer, other racers and/or the race itself. Such racing information can be obtained from the company who organizes the race, for example, via a prior agreement or contract, and may be transmitted through the communication link 312 of FIG. 3, for example, to the management system 308 during the race.

Referring back to FIG. 4, the transaction module 412 of FIG. 4 is further configured to tally the number of users who selected each racer. According to the tally result (connection share) and the race result, points may be allocated to the users. For example, referring back to FIG. 1, suppose there are N=5 racers participating in the race, and there are M=10,000 users connected to watch the race. The transaction module 412 may tally to result that 4,000 users selected the racer 1, 3,000 users selected the racer 2, 2,000 users selected the racer 3, 500 users selected the racer 4, and 500 users selected the racer 5. Further suppose the racer 5 finished the race first, and the racer 1 finished the race second. Then, the transaction module 412 may be configured to give 20 points to each of the 500 users who selected the racer 5, and 2 points to each of the 4,000 users who selected the racer 1. Sponsors for the race or the advertisement may prepare goods or services that can be exchanged with a predetermined number of points. Thus, the users can experience additional entertainment by competing to accumulate the points to be redeemed, while the sponsors take advantage of the opportunity to promote their goods or services. For example, 100 points may be redeemed with a T-shirt having the logo of a motorcycle's manufacturer, 150 points may be redeemed with a pair of racer's gloves, 200 points may be redeemed with a dinner with the selected racer, etc. Furthermore, bonuses or awards may be given to the racers according to the connection share, providing the racers with an incentive to wear the cameras and microphones and cooperate in the present entertainment business.

The present system can be used for gambling as well. Gambling is regulated, and the regulations differ from country to country as well as from state to state in the U.S. In a conventional gambling, such as a horse racing, a gambler stakes money on a horse as a bet, and if it comes in first place, the bet is the winner. The winner gets money based on the pooled money and distribution rules. These transaction activities take place at a gambling station associated with the racetrack. In contrast, the present system can be configured to offer online gambling by allowing a user to bet on the racer of his/her choice. As explained earlier, prior to the race, the input information including the account information and the choice of a racer is obtained by the transaction module 412 from each user as inputted on the client terminal. A prompt page may be configured for the users to input necessary information. An option of playing the gamble may be shown on the prompt page, for example, so that the user can click the option button to choose to gamble. Upon choosing the option to gamble, the user is asked to enter age, residency and other personal information. The transaction module 412 receives the personal information, thereby determining if the user is permitted to gamble by looking up the national or state regulations that can be pre-stored in the memory 420, for example. Once all criteria are met to gamble, the user is allowed to play the gamble. The user may be prompted to bet money on the racer of his/her choice. The money may be withdrawn by using the payment method the user selected, for example, via credit card payment, PayPal, money order or other methods. After the race, the winner gets money based on distribution rules. The distribution rules may be predetermined based on the amount of the pooled money, the number of connections per racer (connection share) and the race result (which racer was the first, the second, and so on). Instead of money, points may be given to the users according to the distribution rules. Additionally, the winning money may be exchanged with points. The users can thus accumulate the points to redeem with the goods or services provided by the sponsors. These transaction activities may be controlled by the transaction module 412. The winning money may be paid to the credit card account of the winners, for example. Alternatively, the winning money can be pooled for betting for one or more of the subsequent races. Furthermore, the user may borrow money for betting. For example, prior to a race, the user may borrow a certain amount of money to enjoy betting and pay it back after the race. Alternatively, it may be arranged that the user can continue gambling for the subsequent races and postpone the payback, and the borrowed amount of money can be returned at the end of the series or any time during the series. If the user needs additional money during the series, he/she may be allowed to borrow more money even during the series. For example, suppose there are 16 races per season. The user may borrow $1,000 prior to the series of races. After betting 8 races, he/she spent all $1,000 for betting, but wishes to continue gambling. The user may be allowed to borrow additional $1,000 to bet for the subsequent 8 races and pay back $2,000 after the 16 races. However, the limit may be imposed according the credit limit, credit history and other conditions pertaining to the user. In addition, a certain percentage of the profit may be arranged for charities, donations or gifts for victims of natural disasters, refugees in war zones, etc. for the purpose of tax exemption as well as to improve perceptions of racing, and/or gambling.

Figure 6:
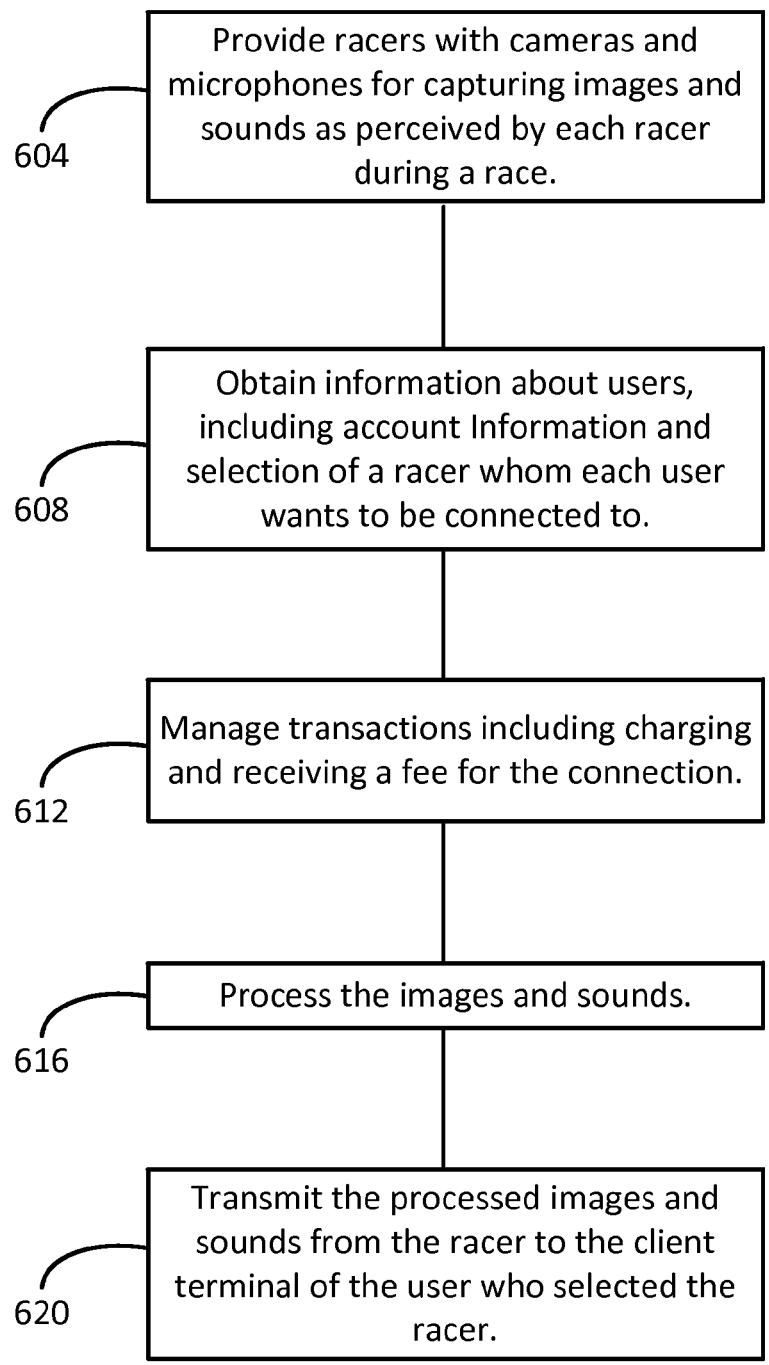
FIG. 6 illustrates a method of providing users with racing entertainment by transmitting images and sounds as perceived by a racer of the user's choice.

FIG. 6 illustrates a method of providing users with racing entertainment by transmitting images and sounds as perceived by a racer of the user's choice. Multiple racers participate in a race; and a large number of users can be entertained through the present system of FIG. 3 including the management system 308, network 316 and multiple client terminals that the users use, respectively. The client terminals may include cellular phones, smart phones, iPad®, tablets and other mobile devices or TV systems. Each client terminal is configured to have a screen and a speaker to reproduce the images and sounds. The order of steps in the flow charts illustrated in this document may not have to be the order that is shown. Some steps can be interchanged or sequenced differently depending on efficiency of operations, convenience of applications or any other scenarios. In step 604, each racer is provided with one or more cameras and one or more microphones that can be attached to the proximity of his/her eyes and ears. These devices may be attached to the face or head of the racer directly, his/her helmet or other protection gear. In step 608, information pertaining to each user is obtained, via, for example, a prompt page for inputting the information on a screen of the client terminal that the user is using. The input information includes account information, such as an ID of the user, his/her choice of the payment method (credit card, PayPal®, money order, etc.) his/her credit card number if the credit card payment is chosen, and the like. In addition, the input information includes which racer the user selects, so that the user can virtually share the common experience with his/her favorite racer through the images and sounds captured by the cameras and microphones placed in the proximity of the racer's eyes and ears. A device including both a camera and a microphone, or other sensing devices may be used. In step 612, the transaction is managed, including charging and receiving a fee for the connection between the user and the selected racer. The fee can be paid through the payment method that the user specified. In step 616, the images and sounds captured by the device attached to each racer are processed by using the image and sound processing module 408 in FIG. 4. For example, the images with different perspectives captured by two or more cameras of the racer may be processed for the user to experience the 3D effect. In another example, blurred or rapidly fluctuating images due to camera shaking may be corrected to be viewed without causing discomfort to the user. In yet another example, a loud noise, such as the roaring sound of the vehicle, may be reduced to a comfort level. In yet another example, the sounds from different audible perspectives captured by two or more microphones of the racer may be processed for the user to experience the stereophonic effect. In step 620, the processed images and sounds from the racer are transmitted to the client terminal of the user who selected the racer.

Figure 7:
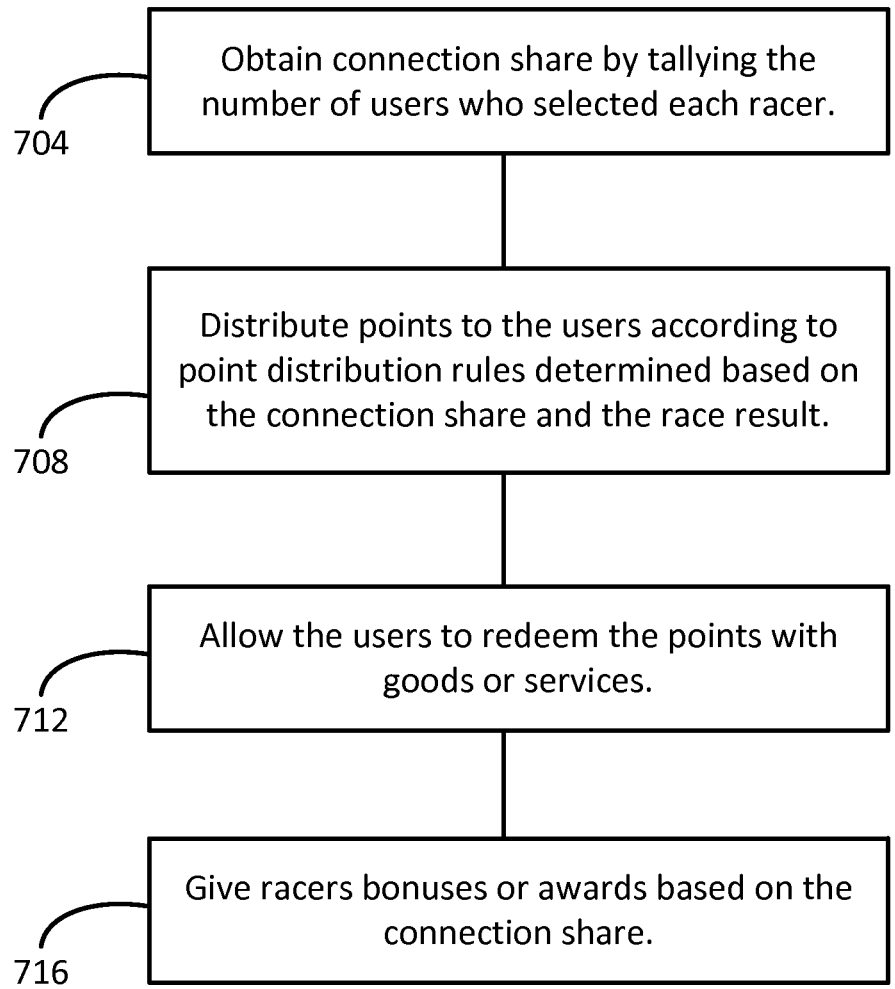
FIG. 7 illustrates an example of the transaction activity that can be conducted in addition to charging and receiving the fee.

In step 612 of the method illustrated h FIG. 6, the management of transactions includes charging and receiving the fee for the connection. This managing step can be modified or expanded to include other transactions. FIG. 7 illustrates an example of the transaction activity that can be conducted in addition to charging and receiving the fee in step 612 of FIG. 6. The steps shown in FIG. 7 can be added to the steps shown in FIG. 6 or other processes controlled by the present system, and the order of combined steps may be sequenced differently or some may be conducted in parallel. Based on the input information obtained in step 608 of FIG. 6, including, the selection of a racer whom each user wants to be connected to, the connection share is obtained in step 704 by tallying the number of users who selected each racer. This step 704 ma be conducted in parallel with, before or after step 612 of FIG. 6, where the connection fee is charged and received. After the race, such as after step 620 of FIG. 6, points may be distributed to the users in step 708. The point distribution rules may be predetermined based on the connection share and the race result. For example, referring hack to FIG. 1, suppose there are N=5 racers participating in the race, and there are M=10,000 users connected to watch the race. The connection share can be obtained in step 704 based on the tally result giving that 4,000 users selected the racer 1, 3,000 users selected the racer 2, 2,000 users selected the racer 3, 500 users selected the racer 4, and 500 users selected the racer 5. Further suppose the racer 5 fished the race first, and the racer 1 finished the race second. Then, the points to the users may be distributed in step 708 according to the point distribution rules to give 20 points to each of the 500 users who selected the racer 5, 2 points to each of the 4,000 users who selected the racer 1, and 0 points to the other users. Sponsors for the race or the advertisement may prepare goods or services that can be exchanged with a predetermined number of points. The users are allowed to accumulate points from multiple races and to redeem the points with the goods or services in step 712. Using, this point system, the sponsors can take advantage of the opportunity to promote their goods or services. For example, 100 points may be redeemed with a T-shirt having the logo of a motorcycle's manufacturer, 150 points may be redeemed with a pair of racer's gloves, 200 points may be redeemed with a dinner with the selected racer, etc. Furthermore, bonuses or awards are given to the racers according to the connection share in step 716, providing the racers with an incentive to wear the cameras and microphones and cooperate in the virtual entertainment business.

Figure 8:
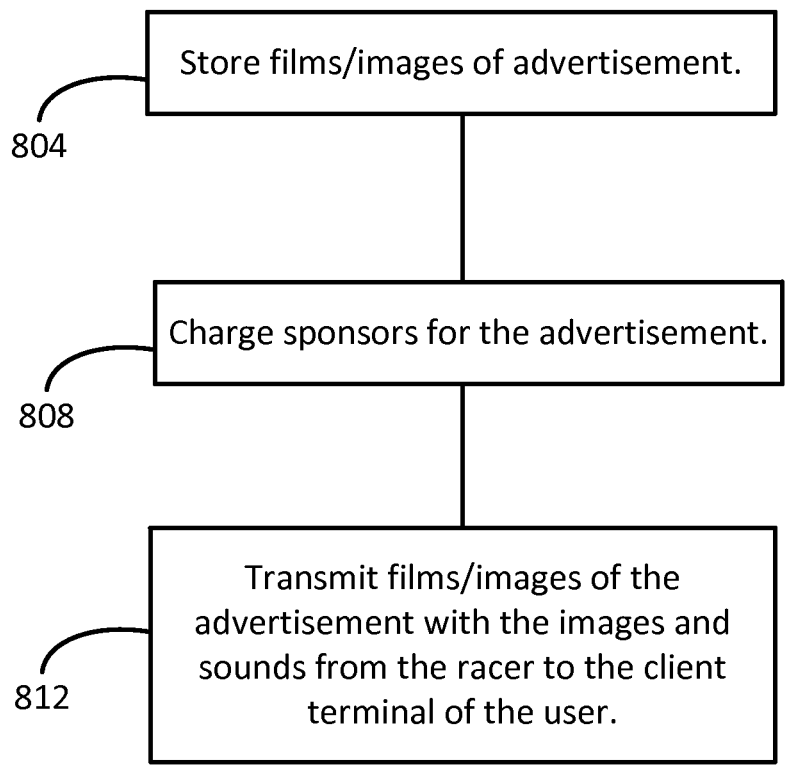
FIG. 8 illustrates another example of the transaction activity that can be conducted in addition to charging and receiving the fee.

FIG. 8 illustrates another example of the transaction activity that can be conducted in addition to charging and receiving the fee in step 612 of FIG. 6. The steps shown in FIG. 8 can be added to the steps shown in FIG. 6, to the combined steps shown in FIGS. 6 and 7 or other processes controlled by the present system, and the order of combined steps may be sequenced differently or some may be conducted in parallel. Sponsors for the race, sponsors for the goods or services redeemable in the point system, or other marketers may want to show advertisement to the users watching the race. The films or images showing such advertisement may be prepared by the sponsors, and stored in the memory 420 of the present system in step 804. The sponsors are charged for the advertisement in step 808. In step 812, these films or images of the advertisement may be combined with the images and sounds from the racer and transmitted to the client terminal of the user who selected the racer in step 812. The combination of the race and the advertisement may be displayed, as shown in the example of FIG. 5, on the screen of the client terminal.

Figure 9:
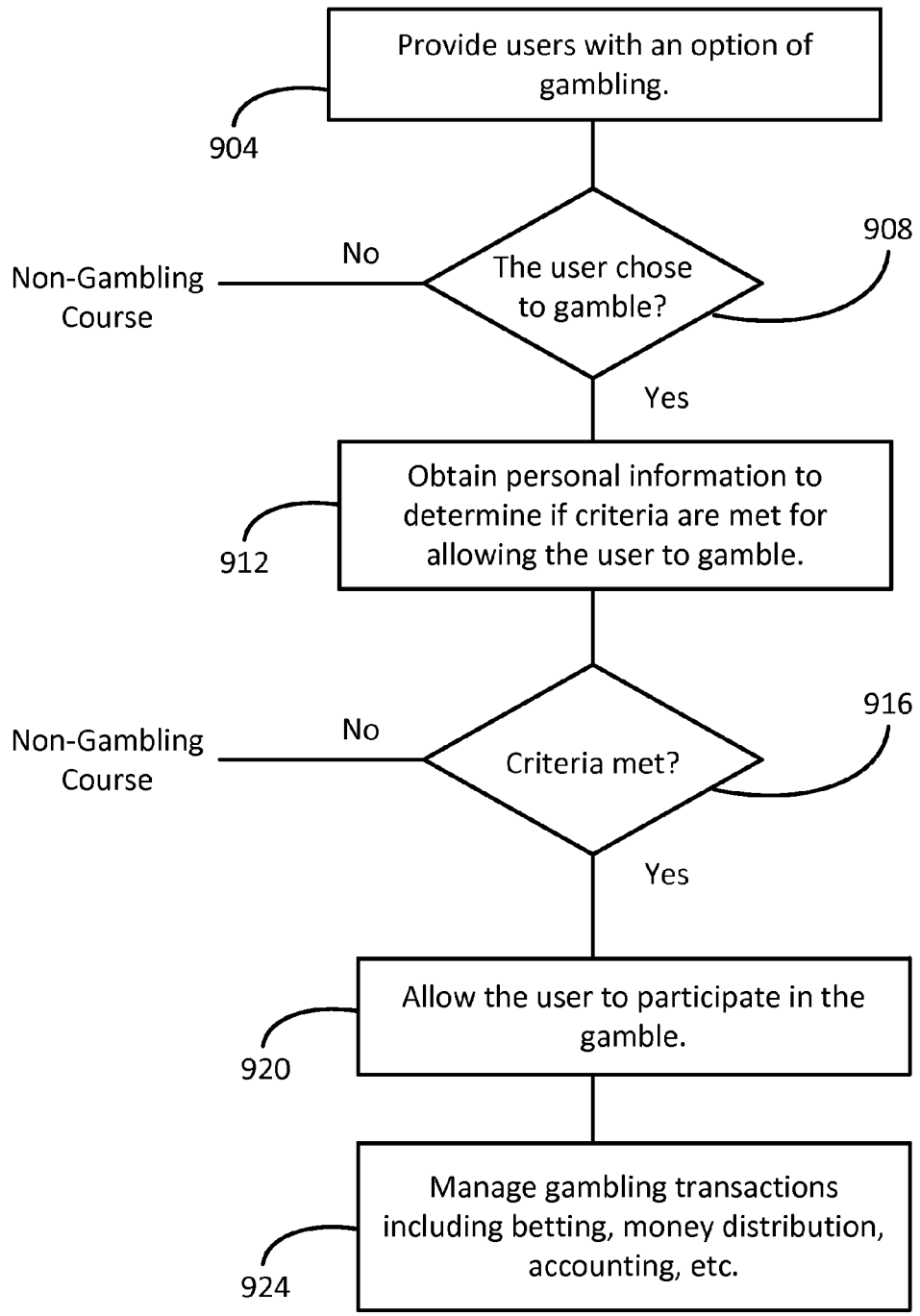
FIG. 9 illustrates an example of providing gambling that can be conducted in addition to charging and receiving the fee.

FIG. 9 illustrates an example of providing gambling that can be conducted in addition to charging and receiving the fee in step 612 of FIG. 6. The steps shown in FIG. 9 can be added to the steps shown in FIG. 6, to the combined steps shown in FIGS. 6 and 7. FIGS. 6 and 8, or FIGS. 6, 7 and 8, or other processes controlled by the present system. The order of combined steps may be sequenced differently or some may be conducted in parallel. In step 904, the users are provided with an option of gambling. Such an option may be shown in the prompt page on the client terminal, for example, so that the user can click the option button to choose to gamble. Upon choosing, the option to gamble in step 908, the user is asked to enter age, residency and other personal information. Such personal information is obtained in step 912 to determine if the user is permitted to gamble by looking up the national or state regulations that can be pre-stored in the memory 420, for example. If the user chose not to pursue gambling in step 908, the process proceeds to the non-gambling course, such as to step 608 of FIG. 6, step 704 of FIG. 7, or step 812 of FIG. 8, for example. In step 916, it is determined if the criteria to play the gamble are not met based on the personal information of the user compared to the regulations, the user is denied to play the gamble and the process proceeds to the non-gambling course. If it is decided in step 916 that the criteria are met for the user to play the gamble, the user is allowed to participate in the gamble in step 920. There are in general many ways to gamble. Various transaction activities associated gambling, such as betting, money distribution, accounting, etc. are managed in step 924.

For example, in step 924, the user may be prompted to bet money on the racer of his/her choice. It can be configured that the racer whom the user wants to get connected to is the racer on whom the user bets money. The money may be withdrawn by using the payment method the user specified, for example, via credit card payment, PayPal, money order or other methods. After the race, the winner gets money based on distribution rules. The distribution rules may be predetermined based on the amount of the pooled money, the number of connections per racer (connection share) and the race result (which racer was the first, the second, and so on). Instead of money, points may be given to the users according to the distribution rules. Additionally, the winning money may be exchanged with points. The users can thus accumulate the points to redeem with the goods or services provided by the sponsors. These transaction activities may be controlled by the transaction module 412. The winning money may be paid to the credit card account of the winners, for example. Alternatively, the winning money can be pooled for betting for one or more of the subsequent races. Furthermore, the user may be allowed to borrow money for betting from the pooled money. For example, prior to a race, the user may borrow a certain amount of money to enjoy betting and pay it back after the race. Alternatively, it may be arranged that the user can continue gambling until the end of the series of races, and the borrowed amount of money can be returned to the pool at the end of the series. If the better needs additional money during the series, he/she may be allowed to borrow more money even during the series. However, the limit may be imposed according the credit limit, credit history, and other conditions pertaining to the user. In addition, a certain percentage of the profit may be arranged for charities, donations or gifts for victims of natural disasters, refugees in war zones, etc. for the purpose of tax exemption as well as to improve perceptions of racing and/or gambling.

The various activities conducted at the client terminals can be handled by an application specific to the present racing entertainment. An application herein refers to a computer program designed to help users perform activities. The application can be downloaded from a site associated with the server including the management system 308 through the Internet and placed in the client terminal, distributed directly from the distributer of the application, or placed externally to the client terminal, for example, in the cloud computing environment. The management system 308 and the application can be configured to work together to perform various tasks related to the present racing entertainment. The application can be configured to obtain information about a user, such as account information, by displaying, for example, a prompt page for the user to input such information at the client terminal. Additional activities that can be carried out at the client terminal by using the application include: selection of a racer whom each user wants to be connected with; payment of the connection fee; requests for redemption of points with goods or services; decision as to whether the user wants to participate in gambling; inputting personal information pertaining to the user if he/she wants to participate in the gambling; betting for the gambling; and various other activities pertaining to the user. The input information at the client terminal can be transmitted to the management system 308 to be used to control the transmission of the images and sounds captured by the selected racer to the user as well as to manage various transactions, such as those described with reference to FIGS. 6-9. The application can be further configured to reproduce the images and sounds at the client terminal with a proper format and/or control options for the user to control the images and sounds. Alternatively to using such an application, the reproduction of the images and sounds may be done by using default, built-in functions at the client terminal.

Figure 10:
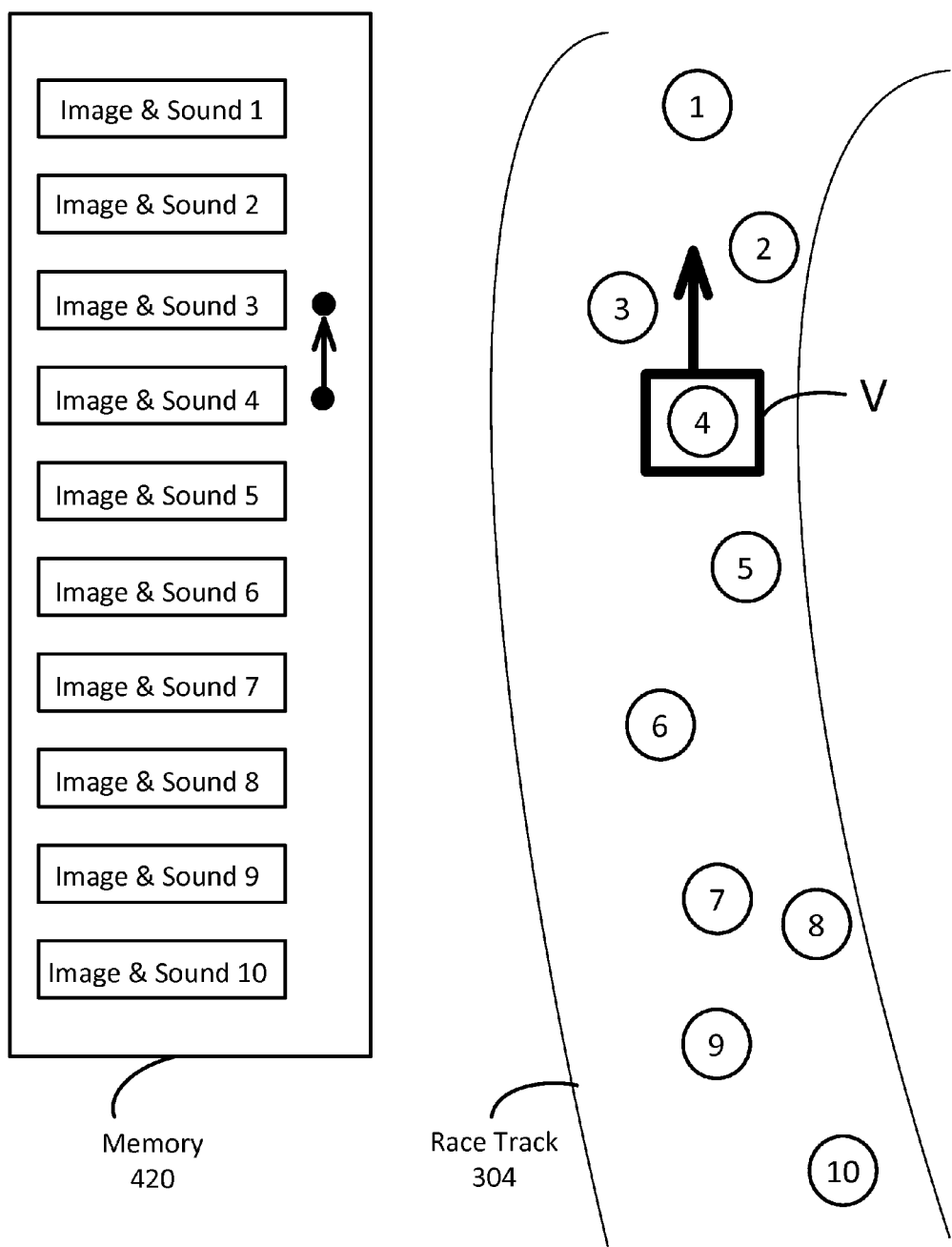
FIG. 10 schematically illustrates how the game can be configured based on the images and sounds captured by actual racers.

The management system 308 and the present method may be further configured to allow users to play a racing game based on a live race. FIG. 10 schematically illustrates how the game can be configured based on the images and sounds captured by actual racers, in this example, there are 10 racers competing in the race that is taking place in the race track 304 in FIG. 3. The racers are identified by reference numerals, 1, 2 . . . and 10, which correspond to the current ranking for simplicity m this example. Each racer is provided with one or more cameras and one or more microphones to capture images and sounds as perceived by the racer during the race. The images and sounds are transmitted to the management system 308, processed by the image and sounds processing module 408, and stored in the memory 420. Image and Sound 1, 2 . . . and 10 in FIG. 10 represent those images and sounds transmitted from the racers 1, 2 . . . and 10, respectively. The present system and method may be configured to provide a user with an option of playing the game, by using an application, for example. If the option is chosen, the application accepts various inputs from the user to present his/her participation as a virtual racer V. The inputs from the user to determine the position of V may include: the velocity, acceleration, body angle, body orientation and various other parameters to represent the user's maneuvers. These parameters can be inputted through peripherals simulating a steering wheel, a gas pedal, a brake and the like. Alternatively, the user may input, those parameters into the application by directly typing in at the client terminal, using a finger sensing function on the screen of the client terminal, a keyboard or any other input method. The positions, velocities and other characteristics of the racers 1, 2 . . . and 10 can be obtained by the management system 308, and associated with the Image and Sound 1, 2 . . . and 10, respectively. Based on at least one of the velocity, acceleration, body angle, body orientation and various other parameters inputted by the user with respect to the positions, velocities and other characteristics of the racers 1, 2 . . . and 10, the application may be configured to determine the current position of the virtual racer V, which represents the participation of the user in the race. Thresholds for those parameters may be predetermined to determine which racer is the closest, to the virtual racer V so as to transmit the images and sounds captured by that particular racer to the user. For example, in FIG. 10, the position of the virtual racer V is determined to be within a first threshold from the position of the racer 4, and the Image & Sound 4 is transmitted and reproduced at the client terminal of the user as if he/she is running at the rank 4. If the user wants to pass the racer 3, he/she increases the velocity, and when the position becomes within the first threshold from the position of the racer 3, the Image & Sound 3 is transmitted and reproduced at the client terminal of the user as if now he/she is running at the rank 3.

Figure 11A:
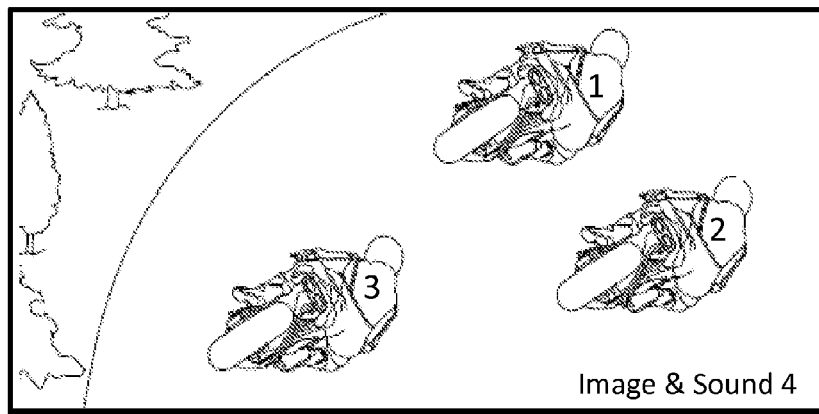
FIGS. 11A-11C illustrate images perceivable from the view point of the virtual racer V, who was at the rank 4, passing the racer 3 to be at the rank 3.
Figure 11B:
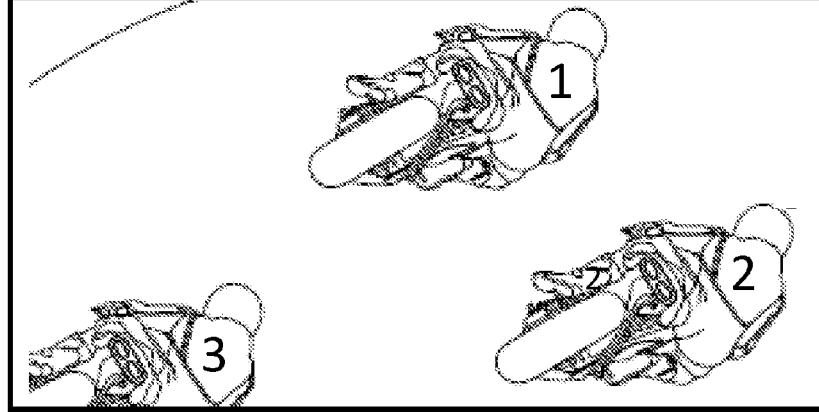
Figure 11C:
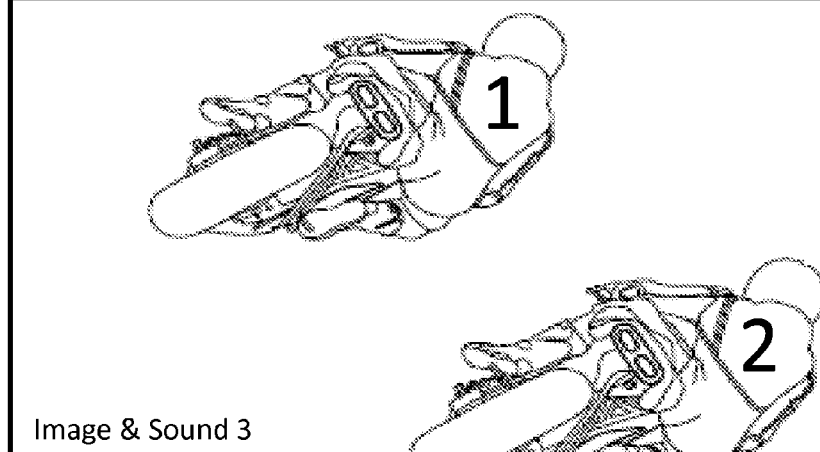

FIGS. 11A-11C illustrate images perceivable from the view point of the virtual racer V, who was at the rank 4, passing the racer 3 to be at the rank 3. FIG. 11A illustrates the Image and Sound 4, as captured by the racer 4, which is transmitted and reproduced at the client terminal of the user, wherein the application may be configured to determine that the position of the virtual racer V is the closest to the racer 4 based on the input parameters and predetermined thresholds. Thus, the user represented by the virtual racer V is now viewing the backs of the racers 1, 2 and 3 running before the virtual racer V who is at the position of the racer 4. The associated sounds can be transmitted and reproduced in the similar way. FIG. 11B illustrates the image viewed by the virtual racer V when he/she is increasing the velocity trying to pass the racer 3. This image can be generated by enlarging the Image and Sound 4 captured by the racer 4 and shifting it towards left. The associated sounds can be processed and reproduced in the similar way. The image and sound processing technique based on enlargement, translation, interpolation or extrapolation by use of the images and sounds captured by at least one of the actual racers, or any other techniques known to those skilled in the art can be used to simulate the images and sounds that are perceivable by the virtual racer V running in between the actual racers. FIG. 11C illustrates the image viewed by the virtual racer V when he/she just passed the racer 3 and has become at the rank 3. The application may be configured to determine that the position of the virtual racer V is the closest to the racer 3 based on the input parameters and predetermined thresholds. Accordingly, the Image and Sound 3 captured by the racer 3 is now transmitted and reproduced at the client terminal of the user, and the virtual racer V representing the user is now viewing the backs of the racers 1 and 2 running before the virtual racer V.

Figure 12:
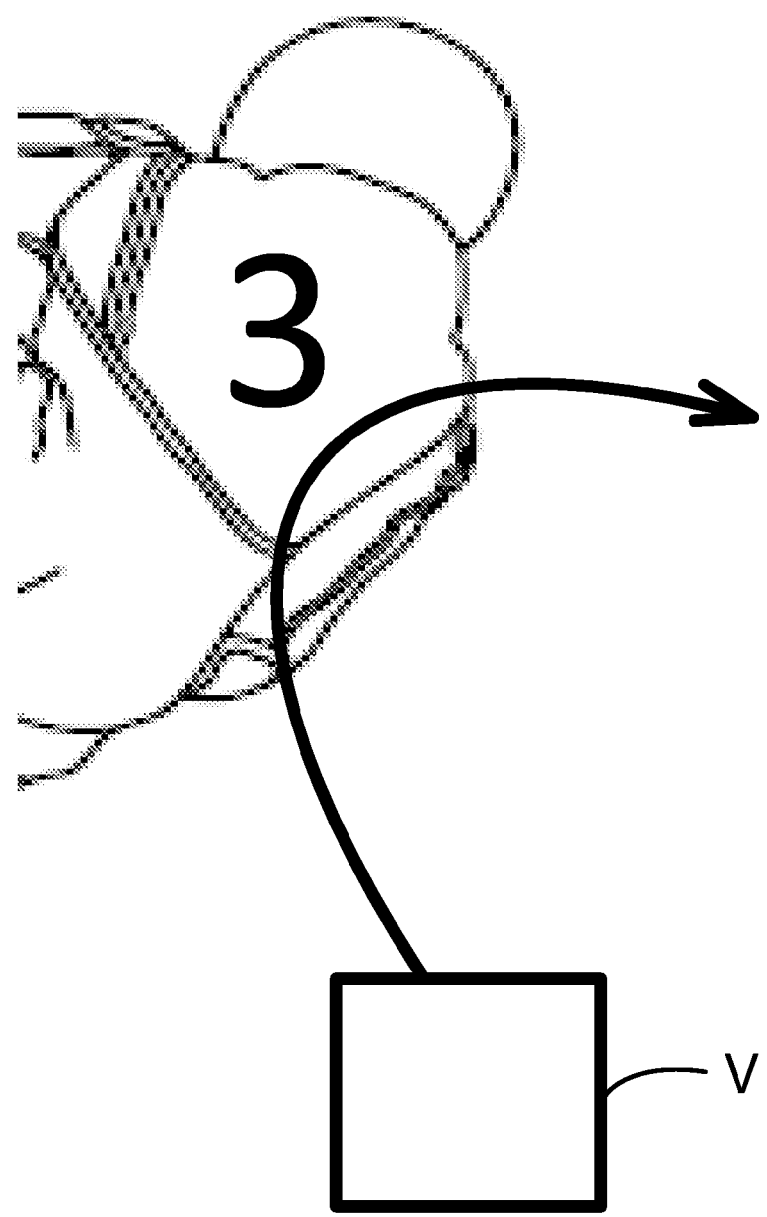
FIG. 12 illustrates a situation in which the virtual racer V is trying to pass the racer 3, but coming too close to the racer 3.

The game can be continued until the race ends. Plausible criteria for the "game over" can be implemented to enhance the virtual participation experience. For example, a collision with an actual racer can be configured to occur. FIG. 12 illustrates a situation in which the virtual racer V is trying to pass the racer 3, but coming too close to the racer 3. As described above, the virtual racer V can pass and become the rank 3 when the position of V becomes within the first threshold from the position of the racer 3, for example. However, if the virtual racer V comes too close to the racer 3 within a second threshold from the racer 3, the application may be configured to determine that it is a collision and issue the "game over" notice.

Another conceivable criterion for the "game over" is a tire burst. Race conditions including the weather and factors related to the race and the race track can be obtained by the management system 308 and transmitted to the application, for example. The tire temperature of the virtual racer V may be calculated by the application based on, at least part of, the weather conditions including the temperature and humidity, surface conditions of the race track and laps of the race, as well as the velocity, acceleration and other maneuvers inputted by the user. When the tire temperature reaches the maximum allowable temperature specified by the tire manufacturer, for example, the application may be configured to determine that it is a tire burst and issue the "game over" notice.

A collision and a tire burst are addressed above as examples of criteria for the "game over." Additionally, various other factors and/or situations that are likely to occur in an actual race may be incorporated in the application for running the game. It should be noted that the present racing game used on the actual race can be configured to be near live or almost real-time. The live images and sounds captured by the actual racers can be transmitted through the communication link 312 to the management system 308, where those images and sounds are processed by the image and sound processing module 408 and stored in the memory 420. The processing and storage may cause a minor time lag until the images and sounds are transmitted and reproduced at the client terminals. However, such time lag can be made well within a human tolerance for the user to feel the live or real-time experience.

To play the racing game, the connection to the actual race has to be made. Thus, the connection fee may be charged. Prior to the race, the input information including the account information is obtained by the transaction module 412 from each user as inputted on the client terminal by using an application, for example. Payment can be made using the payment method that the user specified as part of the account information. Transactions including such charging receiving of the connection fee can be handled by the transaction module 412. Furthermore, in order to enjoy the game, the user may need to obtain an application specifically designed for the gaming purpose. The application for the racing game can be downloaded from a site associated with the server including the management system 308 in FIG. 3 through the Internet and placed in the client terminal, distributed directly from the distributer of the application, or placed externally to the client terminal, for example, in the cloud computing environment. The transaction module 412 may be configured to manage the distribution of the application and associated transactions. This game application can be included in the other application that is used for inputting user information and performing transactions and various other tasks for users at the client terminals. Alternatively, this game application may be designed and associated with the client terminals as a separate application. Additionally or alternatively, the transaction module 412 may be configured to include an algorithm to control the game.

The application for playing a racing game as above may be extended to communicate with multiple users so that the multiple users can compete in the same racing game. The application can be configured to accommodate virtual racers V1, V2 . . . and VN corresponding, to the user 1, user 2 . . . and user N who participate in the same racing game. Thus, the users have an opportunity not only to virtually participate in the race but also to virtually compete against other users in the same race that is actually taking place. To enhance the entertainment, points may be allocated to the users according to the game result. For example, a virtual racer who finished the racing, game first gets 20 points, and another virtual racer who finished the racing game second gets 10 points. The users can accumulate points by participating in multiple racing games. Sponsors for the race or the advertisement may prepare goods or services that can be exchanged with a predetermined number of points. Thus, the users can experience additional entertainment by competing to accumulate the points to be redeemed, while the sponsors take advantage of the opportunity to promote their goods or services. For example, 100 points may be redeemed with a T-shirt having the logo of a motorcycle's manufacturer, 150 points may be redeemed with a pair of racer's gloves, 200 points may be redeemed with a dinner with a selected racer, etc. The transaction module 412 may be configured to receive requests for redeeming points from the users, exchange goods or services with the points for each user, and various other transactions associated with the point system based on the racing game.

Figure 13:
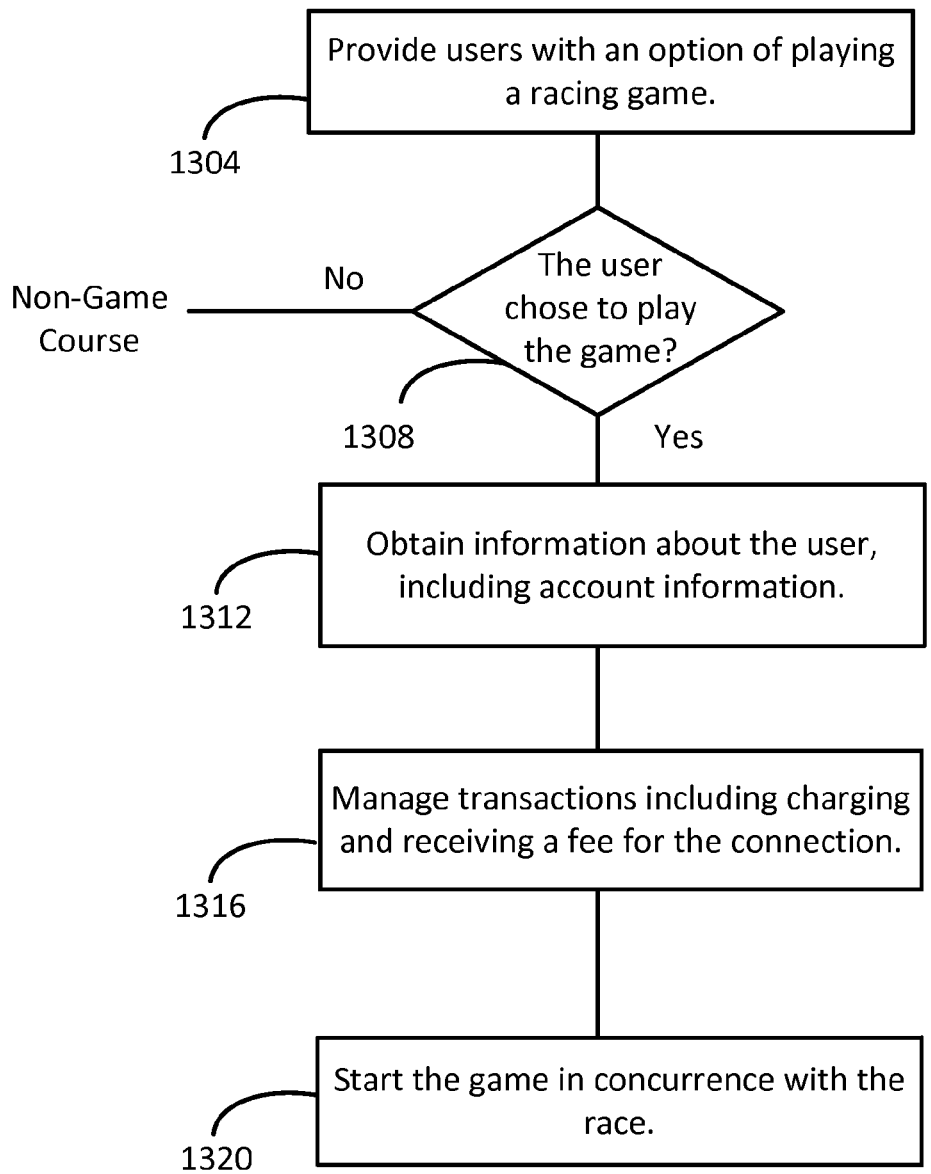
FIG. 13 illustrates an example of a process flow for providing the racing game based on an actual race.

FIG. 13 illustrates an example of a process flow for providing the racing game based on an actual race. The steps shown in FIG. 13 can be added to the steps in other processes controlled by the present system. The order of combined steps may be sequenced differently or some may be conducted in parallel. In step 1304, the users are provided with an option of playing the racing game. Such an option may be shown in the prompt page by running an application on client terminal, for example, so that the user can click the option button to choose to play the racing game. If the user chose not to play the racing game in step 1308, the process proceeds to the non-game course, such as to step 608 of FIG. 6, step 704 of FIG. 7, step 812 of FIG. 8 or step 904 of FIG. 9, for example. If the user chose to play the racing game in step 1308, information pertaining to each user is obtained in step 1312, via, for example, a prompt page by running an application for inputting the information on a screen of the client terminal. The input information includes account information, such as an ID of the user, his/her choice of the payment method (credit card, PayPal®, money order, etc.), his/her credit card number if the credit card payment is chosen, and the like. In addition, the prompt page may include an inquiry as to whether the user wants to obtain the application designed for playing the racing game. The application can be downloaded from a site associated with the server including the management system 308 through the Internet and placed in the client terminal, distributed directly from the distributer of the application, or placed externally to the client terminal, for example, in the cloud computing environment. The transaction module 412 may be configured to manage the distribution of the application and associated transactions. This game application can be included in the other application that is used for inputting user information and performing transactions and various other tasks for users at the client terminals. Alternatively, this game application may be designed and associated with the client terminals as a separate application. In step 1316, various transactions are managed, including charging and receiving a fee for the connection between the user and the actual race. The fee can be paid through the payment method that the user specified. In step 1320, the racing game may be started by using the game application, for example, as soon as the actual race starts.

Figure 14:
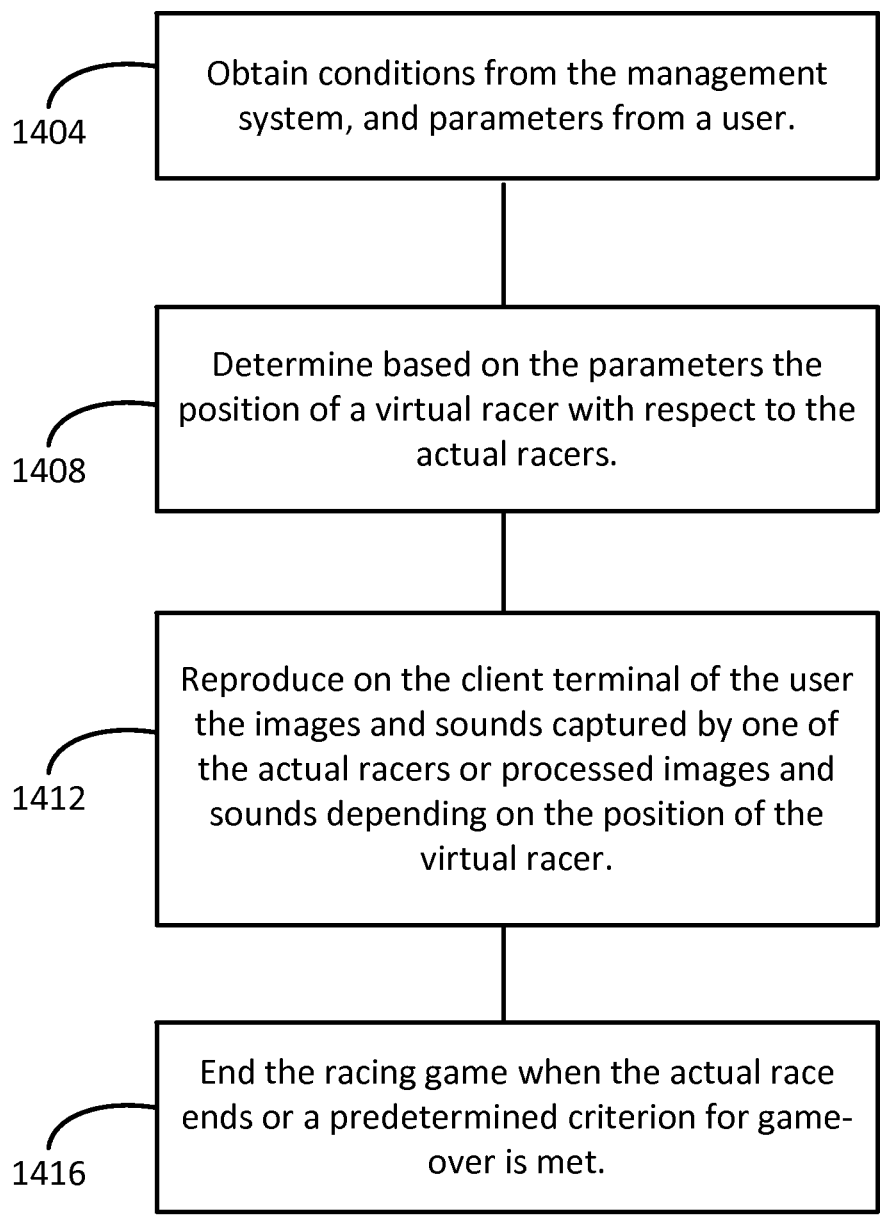
FIG. 14 illustrates an example of a process flow of the application designed for the racing game.

FIG. 14 illustrates an example of a process flow of the application designed for the racing game. This game application can be included in the application that is used for inputting user information and performing transactions and various other tasks for users at the client, terminals, such as those described with reference to FIGS. 6-9 and 13. Alternatively, this game application may be designed and associated with the client terminals as a separate application Additionally or alternatively, the transaction module 412 may be configured to include an algorithm to control the game. When the game is started, in step 1404, race conditions including the weather and other factors related to the race and the race track may be obtained by the management system 308 and transmitted to the application associated with the client terminal. Also in step 1404, various parameters are inputted by the user to present his/her participation as a virtual racer. The inputs from the user to determine the position of the virtual racer may include: the velocity, acceleration, body angle, body orientation and various other parameters that can be inputted through peripherals simulating a steering wheel, a gas pedal, a brake and the like. Alternatively, the user may input those parameters into the application by directly typing in at the client terminal, using a finger sensing function on the screen of the client terminal, a keyboard or any other input method. The positions, velocities and other characteristics of the actual racers, as well as associated images and sounds, respectively, are obtained by the management system 308. Based on at least one of the velocity, acceleration, body angle, body orientation and various other parameters inputted by the user with respect to the positions, velocities and other characteristics of the actual racers, the application is configured to determine in step 1408 the current position of the virtual racer, which represents the participation of the user in the race. In step 1412, the images and sounds captured by one of the racers who is the closest to the position of the virtual racer are reproduced on the client terminal of the user represented by the virtual racer. Thresholds for the parameters may be predetermined to determine which racer is the closest to the virtual racer. For example, the position of the virtual racer is determined to be within a first threshold from the position of one of the racers, and the images and sounds captured by the racer are transmitted and reproduced at the client terminal of the user as if he/she is running at the same rank as the racer. If the user wants to pass the racer, he/she increases the velocity, and when the position becomes within the first threshold from the position of the racer running in front of the previous racer whom the virtual racer just passed, the images and sounds captured by the racer, who is running in front of the previous racer that the virtual racer just passed, are transmitted and reproduced at the client terminal of the user. There are instances wherein the position of the virtual racer is somewhere between two racers. In other words, the distance between the virtual racer and any one of the racers can be beyond the first threshold. In this case, images captured by at least one of the nearby racers can be processed by enlarging and shifting to simulate the images from the virtual racer's view point. The associated sounds can be processed and reproduced in the similar way. The image and sound processing, technique based on enlargement, translation, interpolation or extrapolation by use of the images and sounds captured by at least one of the actual racers, or any other techniques known to those skilled in the art can be used to simulate the images and sounds perceivable by the virtual racer at the position in between actual racers. Accordingly, in step 1412, the images and sounds captured by one of the actual racers, who is the closest to the virtual racer, or processed images and sounds are reproduced on the client terminal depending on the position of the virtual racer. In step 1416, the game is over when the actual race ends. Alternatively, various "game-over" criteria can be predetermined. For example, if the virtual racer comes too close to a racer within a second threshold from the racer, it is determined that a collision occurred and the game is terminated. In another example, the tire temperature of the virtual racer may be calculated based on, at least part of, the weather conditions including the temperature and humidity, surface conditions of the race track and laps of the race, as well as the velocity, acceleration and other maneuvers inputted by the user. When the tire temperature reaches the maximum allowable temperature specified by the tire manufacturer, for example, it is determined that a tire burst occurred and the game is terminated.

Figure 15:
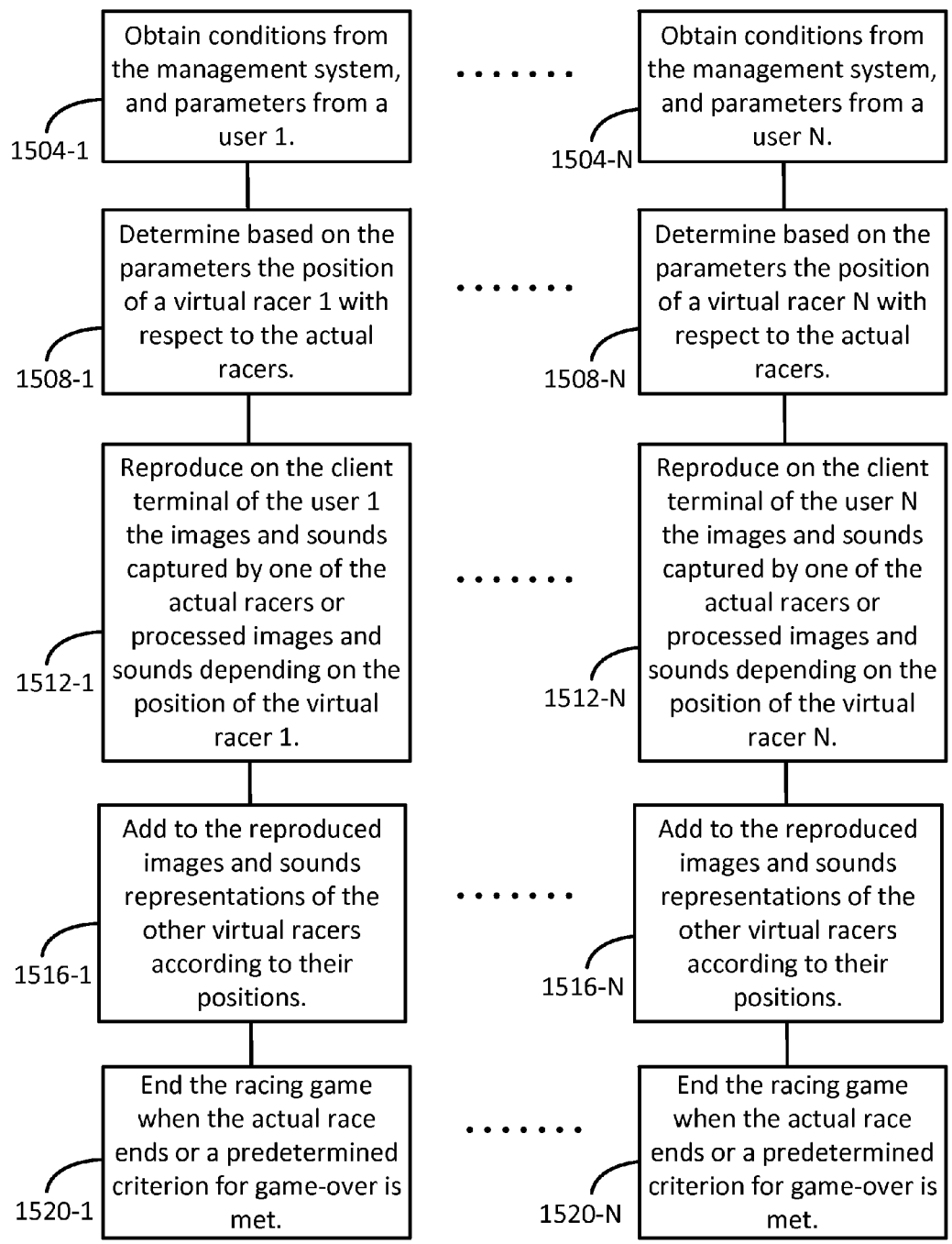
FIG. 15 illustrates an example of process flows of the application running in parallel for the multiple users 1, 2 ... and N.

As mentioned earlier, the process for playing the racing game as above may be extended to communicate with multiple users so that the multiple users can compete in the same racing game. The application may be configured to accommodate virtual racers 1, 2 . . . and N corresponding to the user 1, user 2 . . . and user N who participate in the same racing game. Thus, the users have an opportunity not only to virtually participate in the race but also to virtually compete against other users in the same race that is actually taking place. FIG. 15 illustrates an example of process flows for the multiple users 1-N. As in the single flow of FIG. 14, when the game is started, in steps 1504-1-1504-N, race conditions including the weather and other factors related to the race and the race track may be obtained by the management system 308 and transmitted to the application associated with the client terminals 1-N. Also in steps 1504-1-1504-N, various parameters are inputted by the users 1-N to present his/her participation as virtual racers 1-N, respectively. The inputs from each user to determine the position of the corresponding virtual racer may include: the velocity, acceleration, body angle, body orientation and various other parameters. The positions, velocities and other characteristics of the actual racers, as well as associated images and sounds, respectively, are obtained by the management system 308. Based on at least one of the velocity, acceleration, body angle, body orientation and various other parameters inputted by each user with respect to the positions, velocities and other characteristics of the actual racers, the application determines in steps 1508-1-1508-N the current positions of the virtual racers 1-N, respectively. In steps 1512-1-1512-N, the images and sounds captured by one of the racers who is the closest to the position of each virtual racer are reproduced on the client terminal of the user corresponding to the virtual racer. Thresholds for the parameters may be predetermined to determine which racer is the closest to the vertical racer. For example, the position of the virtual racer is determined to be within a first threshold from the position of one of the racers, and the images and sounds captured by the racer are transmitted and reproduced at the terminal of the user as if he/she is running at the same rank as the racer. If the user wants to pass the racer, he/she increases the velocity, and when the position becomes within the first threshold from the position of the racer running in front of the previous racer whom the virtual racer just passed, the images and sounds captured by the racer, who is running in front of the previous racer that the virtual racer just passed, are transmitted and reproduced at the client terminal of the user. There are instances wherein the position of the virtual racer is somewhere between two racers. In other words, the distance between the virtual racer and any one of the racers can be beyond the first threshold. In this case, images captured by at least one of the nearby racers can be processed by enlarging and shifting to simulate the images from the virtual racer's view point. The associated sounds can be processed and reproduced in the similar way. The image and sound processing technique based on enlargement, translation, interpolation or extrapolation by use of the images and sounds captured by at least one of the actual racers, or any other techniques known to those skilled in the art can be used to simulate the images and sounds perceivable by the virtual racer at the position in between actual racers. Accordingly, in each of steps 1512-1-1512-N, the images and sounds captured by one of the actual racers, who is the closest to the virtual racer, or processed images and sounds are reproduced on the client terminal depending on the position of the corresponding virtual racer. In each of steps 1516-1-1516-N, representations of the other virtual racers can be added to the reproduced images and sounds for each user. In this way, each user knows where the other virtual racers are with respect to the position of his/her own virtual racer. In steps 1520-1-1520-N, the game is over when the actual race ends. Alternatively, various "game-over" criteria can be predetermined. For example, if the virtual racer comes too close to a racer within a second threshold from the racer, it is determined that a collision occurred and the game is terminated. In another example, if the virtual racer comes too close to another virtual racer within a third threshold from the another virtual racer, it is determined that a collision occurred and the game is terminated. In yet another example, the tire temperature of the virtual racer may be calculated based on, at least part of, the weather conditions including the temperature and humidity, surface conditions of the race track and laps of the race, as well as the velocity, acceleration and other maneuvers inputted by the user. When the tire temperature reaches the maximum allowable temperature specified by the tire manufacturer, for example, it is determined that a tire burst occurred and the game is terminated As mentioned earlier, to enhance the entertainment, points may be allocated to the users according to the game result. Such a process flow may be added to the process flows illustrated in FIG. 15. For example, a virtual racer who finished the racing game first gets 20 points, and another virtual racer who finished the racing game second gets 10 points. The users can accumulate points by participating two or more racing games. Sponsors for the race or the advertisement may prepare goods or services that can be exchanged with a predetermined number of points. Thus, the users can experience additional entertainment by competing to accumulate the points to be redeemed, while the sponsors take advantage of the opportunity to promote their goods or services. The transaction module 412 may be configured to receive requests for redeeming points from the users, exchange goods or services with the points for each user, and various other transactions associated with the point system based on the racing game.

Although motorcycle racing is primarily described thus far as an example of the racing entertainment, "races" in this document refer to competitions on speed involving motorcycles, cars, bicycles, boats, aircrafts, horses, skis, skates, skateboards, sleighs, wheelchairs, yachts, and other vehicles or animals; and "racers" refer to participants, i.e., humans, animals or machines, competing the speed in the nice. The system and method described herein can be adapted for any racing entertainment as above.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A method of providing racing entertainment, comprising:
   providing each of a plurality of racers with one or more devices to capture images at sounds as perceived by the racer during a race;
   obtaining information pertaining to each of a plurality of users, including account information and selection of a racer whom the user wants to get connection with;
   managing transactions;
   processing the images and sounds; and
   transmitting the images and sounds from the racer to a client terminal of the user who selected the racer, enabling the user to virtually experience the race as if the user is participating in the race as the selected racer, wherein
   the managing transactions comprises:
   calculating the number of users who selected each racer to obtain connection share;
   distributing points to the plurality of users according to point distribution rules predetermined based on the connection share and a race result;
   allowing the plurality of users to redeem the points with goods or services; and
   giving bonuses or awards to the plurality of racers based on the connection share.

2. The method of claim 1, wherein
   the managing transactions comprises:
   charging each of the plurality of users a fee for the connection to the selected racer to receive the images and sounds from the selected racer; and
   obtaining the fee by using the account information pertaining to the user.

3. The method of claim 1, wherein
   the managing transactions comprises:
   storing films or images of advertisement prepared by a sponsor; and
   charging the sponsor a fee for the advertisement,
   wherein
   the transmitting further comprises transmitting the films or images of the advertisement to the client terminal of each user.

4. The method of claim 1, wherein
   the transmitting further comprises transmitting TV broadcast scenes of the race to the client terminal of each user.

5. The method of claim 1, wherein
   the transmitting further comprises transmitting racing information, including at least one of time, speed, laps and rank of the racers to the client terminal of each user.

6. The method of claim 1, wherein
   the managing transactions further comprises:
   providing the plurality of users with an option of gambling;
   obtaining, personal information pertaining to each user who chose the option of gambling;
   determining if criteria are met for allowing the user to gamble based on the personal information compared to regulations;
   allowing the user to participate in gambling if the criteria are met for the user; and
   managing transactions associated with the gambling.

7. The method of claim 6, wherein
the managing transactions associated with gambling comprises:
managing betting;
obtaining betting money from the users by using the account information; and
distributing points or winning money to winning users based on distribution rules.

8. The method of claim 7, wherein
the distribution rules are predetermined based on an amount of pooled money, connection share and a race result.

9. The method of claim 7, wherein
the managing transactions associated with gambling further comprises:
allowing the winning users to pool the winning money to bet for one or more subsequent races.

10. The method of claim 7, wherein
the managing transactions associated with gambling further comprises:
allowing the users to borrow money to bet for one or more races and pay the money back later.

11. A system comprising:
a receiver for receiving images and sounds captured by one or more devices coupled to each of a plurality of racers in a race;
an image and sound processing module for processing the received images and sounds; and
a transaction module configured to conduct transactions associated with the race and obtain information pertaining to each of a plurality of users, including account information, and further configured to receive selection of a racer whom the user wants to get connection with and transmit the images and sounds from the racer to a client terminal of the user who selected the racer, enabling the user to virtually experience the race as if the user is participating in the race as the selected racer, wherein
the transaction module is further configured to perform operations comprising:
calculating the number of users who selected each racer to obtain connection share;
distributing points to the plurality of users according to point distribution rules redetermined based on the connection share and a race result;
allowing the plurality of users to redeem the points with goods or services; and
giving bonuses or awards to the plurality of racers based on the connection share.

12. The system of claim 11, wherein
the transaction module is further configured to perform operations comprising:
charging each of the plurality of users a fee for the connection to the selected racer to receive the images and sounds from the selected racer; and
obtaining the fee by using the account information pertaining to the user.

13. The system of claim 11, wherein
the transaction module is further configured to perform operations comprising:
storing films or images of advertisement prepared by a sponsor;
charging the sponsor a fee for the advertisement; and
transmitting the films or images of the advertisement to the client terminal of each user.

14. The system of claim 11, wherein
the transaction module is further configured to perform operations comprising:
transmitting TV broadcast scenes of the race to the client terminal of each user.

15. The system of claim 11, wherein
the transaction module is further configured to perform operations comprising:
transmitting racing information including at least one of time, speed, laps and rank of the racers to the client terminal of each user.

16. The system of claim 11, wherein
the transaction module is further configured to perform operations comprising:
providing the plurality of users with an option of gambling;
obtaining personal information pertaining to each user who chose the option of gambling;
determining if criteria are met for allowing the user to gamble based on the personal information compared to regulations;
allowing the user to participate in gambling, if the criteria are met for the user; and
managing transactions associated with the gambling.

17. The system of claim 11, wherein
the system is configured to allow the plurality of users to play a racing game, the racing game based on the images and sounds captured by the plurality of racers, wherein
a virtual racer represents participation of a user in the race to virtually compete against the plurality of racers using parameters inputted by the user.

18. A method of providing racing entertainment, comprising:
providing each of a plurality of racers with one or more devices to capture images and sounds as perceived by each racer during a race;
obtaining information pertaining to each of a plurality of users, the information including account information;
managing transactions;
receiving the images and sounds; and
allowing the plurality of users to play a racing game, wherein the racing game is configured to reproduce on a client terminal of the user the images and sounds captured by one of the plurality of racers, or processed images and sounds that are generated by modifying the images and sounds captured by at least one of the plurality of racers, to display the actual images and sounds of the race from a virtual racer's perspective, the virtual racer representing participation of the user in the race, wherein
the racing game is configured to be played by running an application coupled to a client terminal of a user, the application being a computer program comprising instructions for performing:
obtaining parameters inputted by a user who chose to play the racing game,
determining based on the parameters a position of the virtual racer with respect to the plurality of racers during the race;
reproducing on the client terminal of the user the images and sounds captured by one of the plurality of racers or the processed images and sounds that are generated by modifying the images and sounds captured by at least one of the plurality of racers, depending on the position of the virtual racer; and
ending the racing game when the race ends or one of predetermined criteria for game-over is met.

19. The method of claim 18, wherein
the predetermined criteria for game-over include a criterion based on at least part of race conditions including weather and factors related to the race and a race track.

20. The method of claim 18, wherein
the parameters include at least one of velocity, acceleration, body angle and body orientation to represent the user's maneuvers.

21. The method of claim 18, wherein
the reproducing comprises:
  if the position of the virtual racer is determined to be within a first threshold from the position of one of the plurality of racers, reproducing at the client terminal of the user the images and sounds captured by the one of the plurality of racers.

22. The method of claim 18, wherein
the reproducing further comprises:
  if the position of the virtual racer is determined to be beyond the first threshold from the position of any one of the plurality of racers, reproducing at the client terminal of the user the processed images and sounds,
  wherein the processed images and sounds are generated by modifying the images and sounds captured by at least one of the plurality of racers by using, a processing technique including at least one of enlargement, translation, interpolation and extrapolation.

23. The method of claim 18, wherein
the racing game is configured to be played by running an application by a plurality of users who chose to play the racing, game, wherein the plurality of users are associated with a plurality of client terminals, respectively, the application being a computer program coupled to each of the client terminals and comprising instructions for performing:
  obtaining parameters inputted by the plurality of users,
  determining based on the parameters positions of a plurality of virtual, racers associated, respectively, with the plurality of users, with respect to the plurality of racers during the race;
  reproducing on the client terminal associated with each of the plurality of users the images and sounds captured by one of the plurality of racers or the processed images and sounds that are generated by modifying the images and sounds captured by at least one of the plurality of racers, depending on the position of the virtual racer associated with the user;
  adding to the reproduced images and sounds on the client terminal associated with each of the plurality of users representations of the other virtual racers according, to their positions; and
  ending the racing game when the race ends or one of predetermined criteria for game-over is met, wherein
the virtual racer associated with each of the plurality of users represents participation of the user in the race to virtually compete against the plurality of racers and the other virtual racers, wherein the position of the virtual racer is determined by using the parameters inputted by the user.

24. The method of claim 23, wherein
points are allocated to the plurality of users according to a game result, wherein
the points are accumulated for one or more racing games, and redeemed with goods or services.

* * * * *